(12) United States Patent
Mita et al.

(10) Patent No.: US 6,598,691 B2
(45) Date of Patent: *Jul. 29, 2003

(54) ELECTRIC VEHICLE

(75) Inventors: Yoshinori Mita, Wako (JP); Kazunari Takahashi, Wako (JP); Shiro Yamamuro, Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,029

(22) Filed: Dec. 18, 1998

(65) Prior Publication Data

US 2003/0066694 A1 Apr. 10, 2003

(30) Foreign Application Priority Data

Dec. 18, 1997 (JP) ............................................. 9-348793

(51) Int. Cl.$^7$ ................................................. B60K 1/00
(52) U.S. Cl. ..................... 180/65.1; 180/65.3; 180/65.8; 180/68.5
(58) Field of Search ............... 180/65.1, 68.5, 180/65.6, 65.7, 65.8, 232, 216, 297, 300, 249; 318/139, 801, 254; 280/784; 296/189, 188; 475/149, 149.339; 303/152

(56) References Cited

U.S. PATENT DOCUMENTS

| | | | | | |
|---|---|---|---|---|---|
| 3,367,438 A | * | 2/1968 | Moore | ........................ | 280/65.2 |
| 3,773,132 A | * | 11/1973 | Gawlik et al. | .............. | 180/300 |
| 3,876,026 A | * | 4/1975 | Pronasko | .................... | 180/65.1 |
| 4,130,172 A | * | 12/1978 | Moody | ........................ | 180/65.6 |
| 4,483,408 A | * | 11/1984 | Yazaki | ........................ | 180/297 |
| 4,554,894 A | * | 11/1985 | Johnson | ...................... | 180/232 |
| 4,928,227 A | * | 5/1990 | Burba et al. | ................. | 180/65.3 |
| 5,414,339 A | * | 5/1995 | Masaki et al. | ............... | 318/139 |
| 5,492,193 A | * | 2/1996 | Guertler et al. | ............. | 180/232 |
| 5,555,950 A | * | 9/1996 | Harada et al. | ............... | 180/232 |
| 5,610,483 A | * | 3/1997 | Obara et al. | ................. | 318/139 |
| 5,641,031 A | * | 6/1997 | Reimer et al. | ............... | 180/65.3 |
| 5,662,184 A | * | 9/1997 | Riemer et al. | .............. | 180/65.1 |
| 5,679,087 A | * | 10/1997 | Lutz | ........................... | 475/149 |
| 5,680,908 A | * | 10/1997 | Reed | .......................... | 180/65.3 |
| 5,713,425 A | * | 2/1998 | Buschhaus et al. | ......... | 180/65.2 |
| 5,751,081 A | * | 5/1998 | Morikawa | .................... | 180/249 |
| 5,757,150 A | * | 5/1998 | Kinoshita et al. | ........... | 318/139 |
| 5,857,755 A | * | 1/1999 | Aoki et al. | .................. | 180/65.1 |
| 5,994,789 A | * | 11/1999 | Ochiai | ......................... | 180/65.3 |
| 6,022,048 A | * | 2/2000 | Harshbarger et al. | ....... | 180/300 |
| 6,086,166 A | * | 7/2000 | Fukasawa | .................... | 303/152 |
| 6,231,134 B1 | * | 5/2001 | Fukasawa et al. | .......... | 303/152 |

* cited by examiner

*Primary Examiner*—Brian L. Johnson
*Assistant Examiner*—Hau Phan
(74) *Attorney, Agent, or Firm*—Carrier, Blackman & Associates, P.C.; Joseph P. Carrier; William D. Blackman (57) ABSTRACT

An electric vehicle in which driving force of a motor driven by batteries is transmitted through a reduction device and a differential to front wheels. The motor and the reduction device are disposed at portions of a vehicle body rearwardly of the differential and hence, a portion of the vehicle body in front of the differential is enlarged and can effectively function as a crushable zone upon a frontal collision of a vehicle. Moreover, the motor and the reduction device which are heavy components are disposed near a central portion of the vehicle body, leading to a mid-ship layout. This contributes to an enhancement in motional property of the vehicle.

15 Claims, 9 Drawing Sheets

ELECTRIC VEHICLE

BACKGROUND OF THE INVENTION

1. Field of the Invention

The present invention relates to an electric vehicle which travels by transmitting a driving force of a motor mounted at a front portion of a vehicle body through a reduction device and differential to front driven wheels.

2. Description of the Related Art

Figure 9:
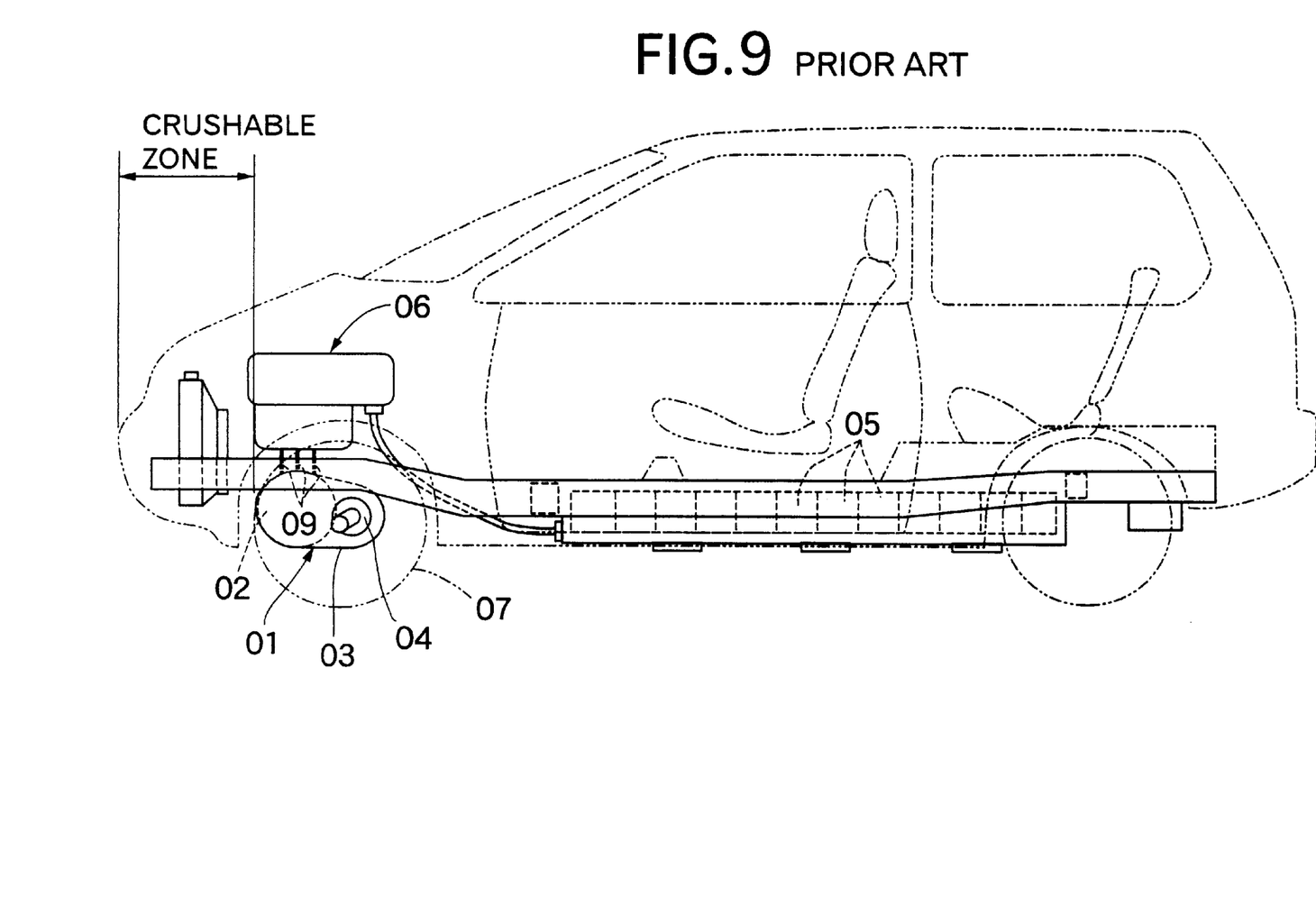
FIG. 9 is an entire side view of a conventional electric vehicle.

FIG. 9 shows a conventional electric vehicle. A power unit 01 mounted at a front portion of a vehicle body is integrally provided with a motor 02, a reduction device 03 and a differential 04, wherein front wheels 07, 07 are driven for traveling of the vehicle by supplying power of batteries 05 mounted at a central portion of the vehicle body through a control unit 06 to the motor 02.

The above conventional electric vehicle suffers from a problem in that it is difficult to enlarge a crushable zone which is crushed upon a collision of the vehicle to absorb a shock, because the motor 02 and the reduction device 03 are disposed at portions of the vehicle body in front of the differential 04. In addition, the motor 02 and the reduction device 03 which are heavy components are disposed at locations largely spaced forwards apart from the center of gravity of the vehicle, which is disadvantageous from the viewpoint of enhancing a in motional property of the vehicle.

SUMMARY OF THE INVENTION

Accordingly, it is an object of the present invention to provide an electric vehicle in which front wheels thereof are driven by a motor, wherein the crushable zone is further enlarged and the motional property of the vehicle is enhanced in comparison to the conventional vechicle.

To achieve the above object, according to a first aspect and feature of the present invention, there is provided an electric vehicle constructed to travel by transmitting a driving force of a motor mounted at a front portion of a vehicle body through a reduction device and a differential to front wheels, wherein the motor and the reduction device are disposed at portions of the vehicle body rearwardly of the differential, and the motor, the reduction device and the differential are disposed below a floor panel.

With the above arrangement, the motor and the reducer are disposed rearwardly of the differential and, therefore, a portion of the vehicle body laying in front of the differential can effectively function as a crushable zone upon a frontal collision of the vehicle. Moreover, since the motor, the reduction device and the differential are disposed below the floor panel, the center of gravity of the vehicle is lowered, leading to an enhanced stability with such disposition, even if the motor, the reduction device and the differential are moved rearwards of the vehicle due to a shock of collision of the vehicle, the influence applied to a vehicle compartment above the floor panel can be suppressed to a minimum. Further, the motor and the reduction device which are heavy components are disposed near the central portion of the vehicle body, leading to a mid-ship layout. This can contribute to an enhancement in the motional property of the vehicle.

According to a second aspect and feature of the present invention, in addition to the arrangement of the first feature, an inverter is mounted to a rear end of the motor for converting DC current of batteries mounted at a central portion of the vehicle body into AC current, the inverter is connected to the batteries.

With the above arrangement, since the inverter is mounted to the motor, the length of an AC power line connecting the inverter and the motor to each other is shortened. Thus, it is possible to reduce the weight, to suppress the generation of heat due to an electric resistance and to reduce the amount of noise generated. Moreover, since the inverter is mounted to the rear end of the motor, the length of a DC power line connecting the batteries mounted at the central portion of the vehicle body and the inverter to each other can be suppressed to the minimum.

According to a third aspect and feature of the present invention, in addition to the arrangement of the first feature, an inverter is provided integrally with the motor for converting DC current of batteries into AC current, and a power line for flowing of the AC current is accommodated within a casing of the reduction device.

With the above arrangement, since the inverter is provided integrally with the motor, the length of a power line connecting the inverter and the motor to each other is shortened. Thus, it is possible to reduce the weight and to suppress the generation of heat due to an electric resistance. Moreover, since the power line for the AC current, which is liable to generate noises is accommodated within the casing of the reduction device, the noise generated from the power line can be shielded by the casing of the reduction device and prevented from leaking to the outside. This is desireable for suppressing the influence of the noise on an audio device and an electronic control unit to the minimum.

The above and other objects, features and advantages of the invention will become apparent from the following description of the presently preferred embodiments taken in conjunction with the accompanying drawings.

BRIEF DESCRIPTION OF THE DRAWINGS

FIGS. 1 to 5 show a first preferred embodiment of the present invention, wherein

FIGS. 6 to 8 show a second embodiment of the present invention, wherein

DETAILED DESCRIPTION OF THE PREFERRED EMBODIMENTS

A first embodiment of the present invention will now be described below with reference to FIGS. 1 to 5.

Figure 1:
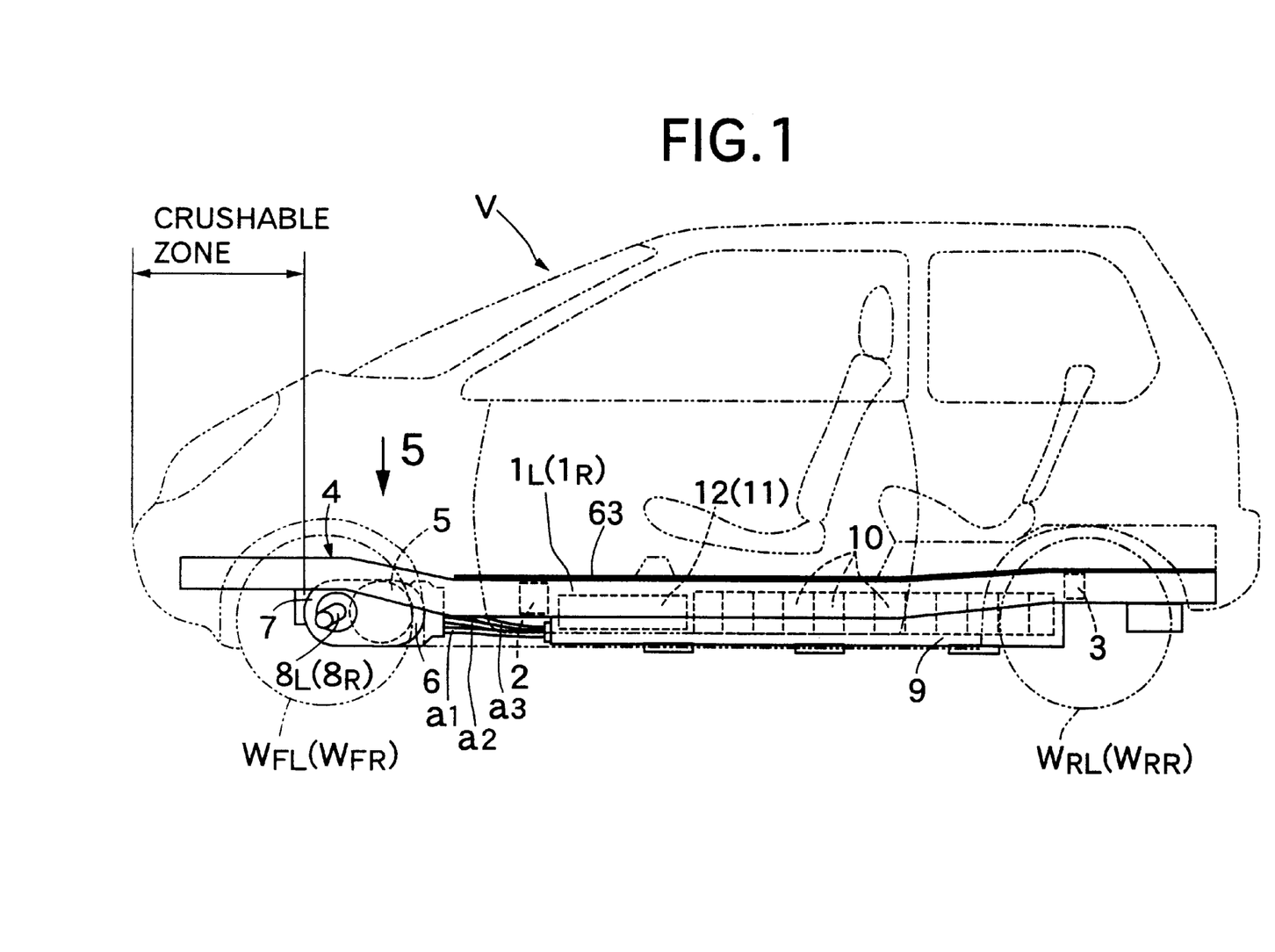
FIG. 1 is a side view of the entire electric vehicle.
Figure 2:
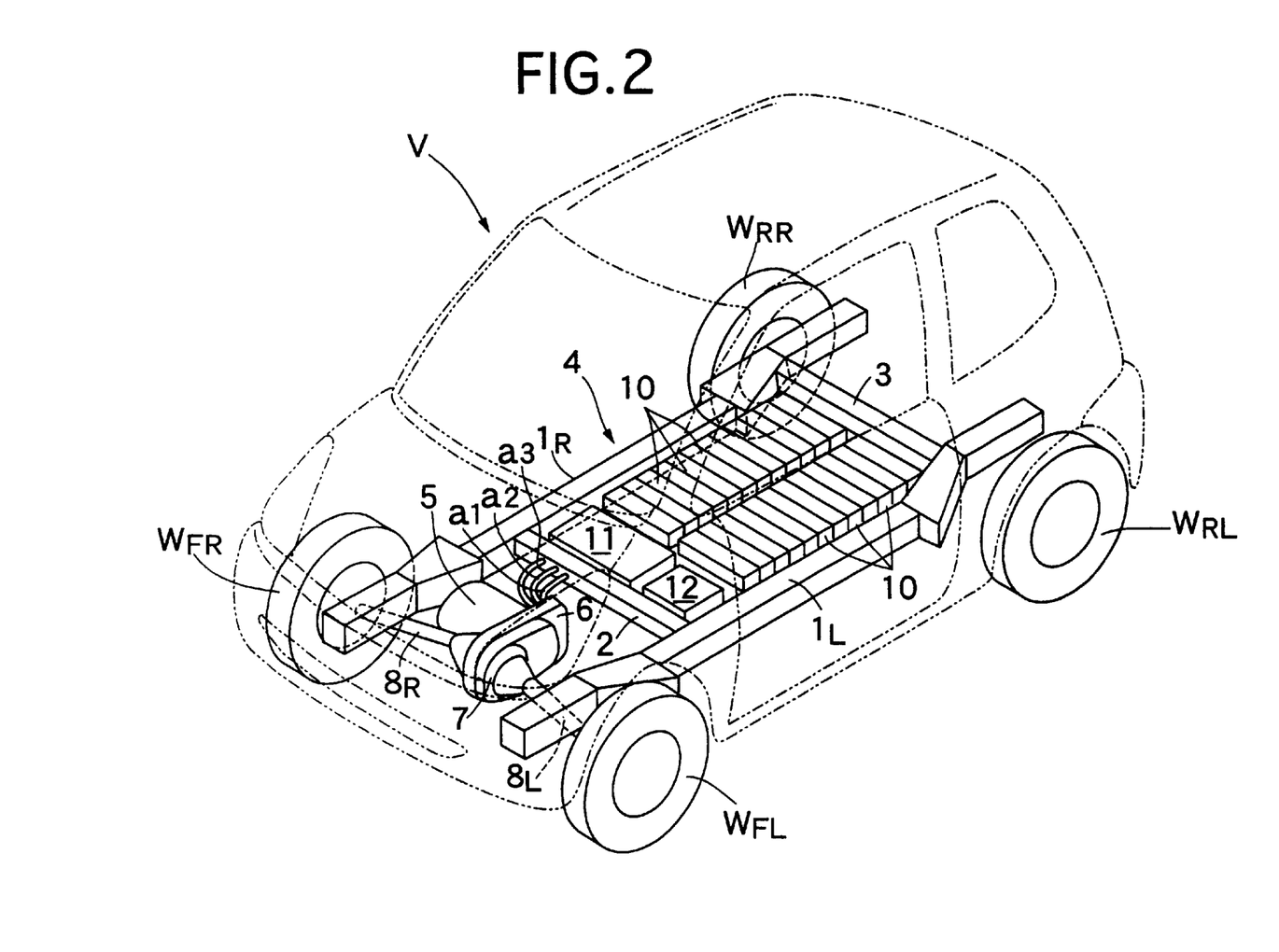
FIG. 2 is a perspective view of the entire electric vehicle.
Figure 3:
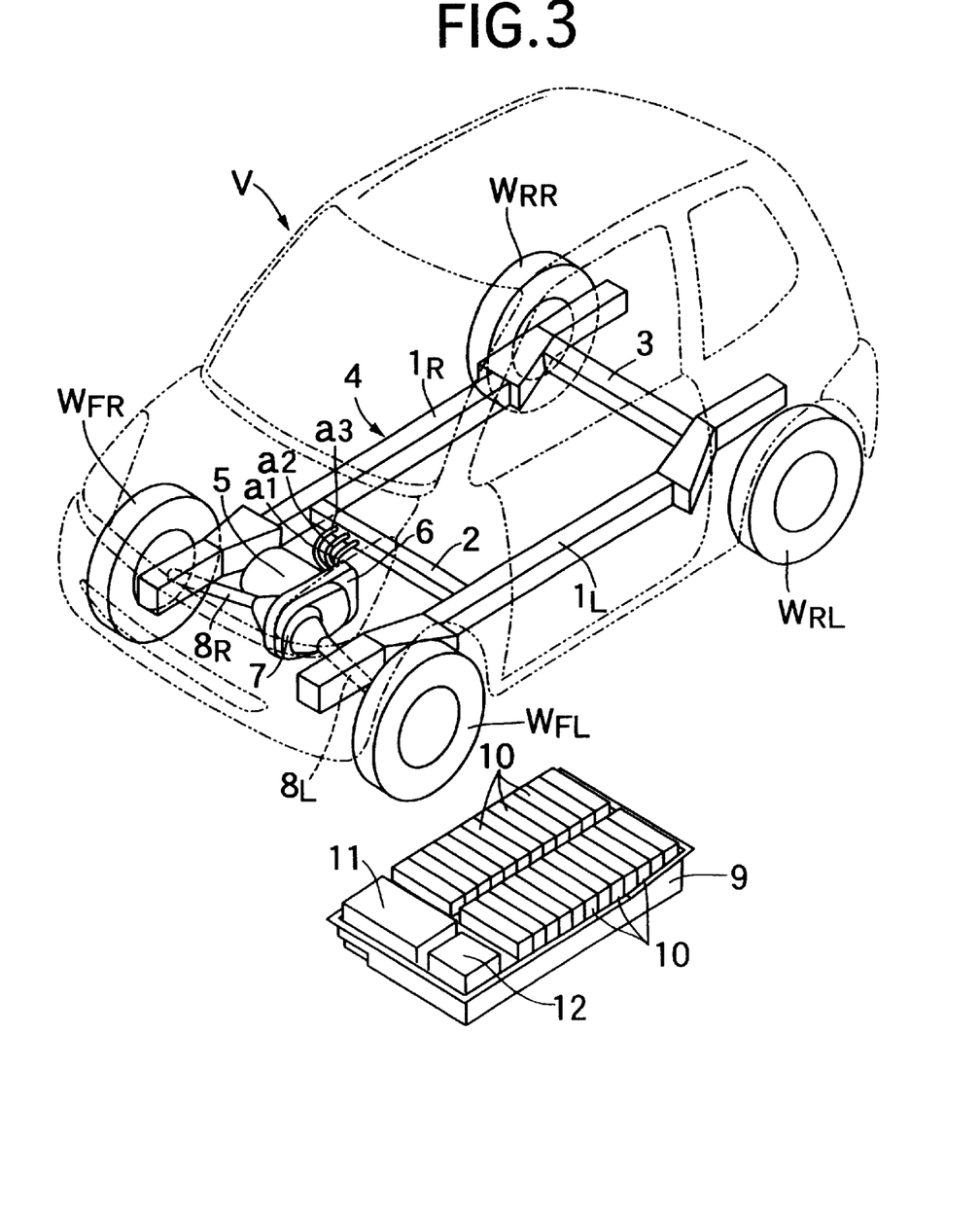
FIG. 3 is a perspective view of the entire electric vehicle with a battery box removed.

As shown in FIGS. 1 to 3, an electric vehicle V provided with left and right front wheels $W_{FL}$ and $W_{FR}$ and left and right rear wheels $W_{RL}$ and $W_{RR}$ includes a vehicle body frame assembly 4 which is comprised of a pair of left and right side frames $1_L$ and $1_R$ extending in a longitudinal direction of a vehicle body, and a front cross member 2 and a rear cross member 3 which extend in a lateral direction of the vehicle body and connect the side frames $1_L$ and $1_R$ to each other. A reduction device 6 and a differential 7 are integrally provided on a motor 5 which is a traveling drive source mounted between front ends of the left and right side frames $1_L$ and $1_R$. Drive shafts $8_L$ and $8_R$ extending laterally from the differential 7 are connected to the left and right front wheels $W_{FL}$ and $W_{FR}$, respectively.

A shallow tray-shaped battery box 9 with its upper surface opened is detachably supported on a lower surface of the vehicle body frame assembly 4. Twenty four batteries 10 for supplying electric current to the motor 5 are mounted in two rows in a rear half of the battery box 9, and the following components (1) and (2) are mounted in a front half of the battery box 9: (1) a control unit 11 for controlling the motor 5, the batteries 10 and various auxiliaries, and (2) a PDU 12 (power drive unit) comprising an inverter for controlling the driving and regenerative operation of the motor 5 by a command from the control unit 11. The PDU 12 is adapted to convert a DC current of the batteries 10 into a three-phase AC current to drive the motor 5, and to convert the three-phase AC current generated by the motor 5 into the DC current to charge the batteries 10 in carrying out the regenerative operation of the motor 5.

Figure 4:
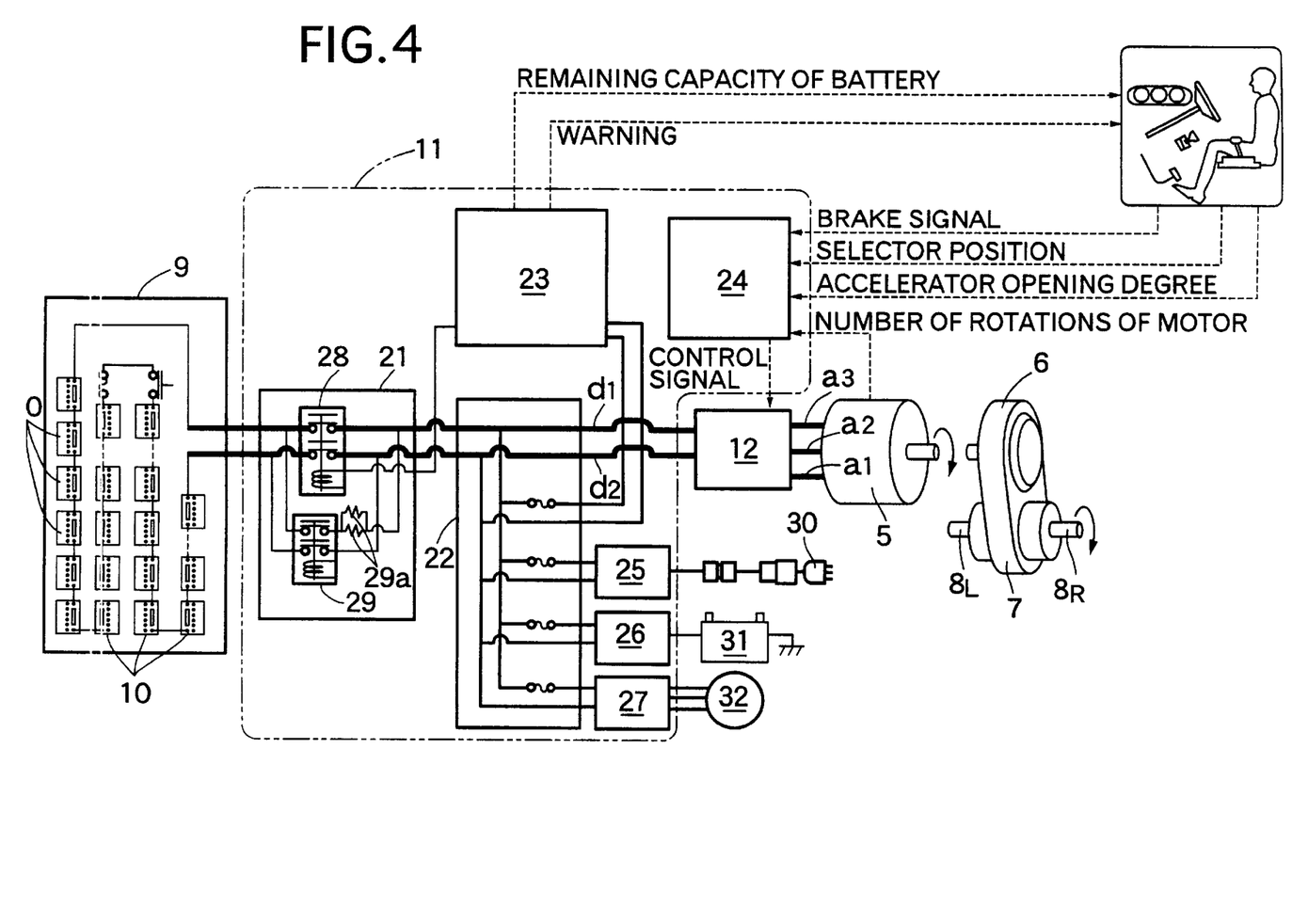
FIG. 4 is a block diagram of a driving system and a control system in the electric vehicle.

The outline of the arrangement of a drive system and a control system for the electric vehicle V will now be described with reference to FIG. 4. In FIG. 4, thick solid lines indicate high-voltage and high-current lines; medium solid lines indicate high-voltage and medium-current lines; and arrowed dashed lines indicate signal lines.

The control unit 11 is comprised of a contact box 21, a junction board 22, a managing ECU 23 (a managing electronic control unit), a motor ECU 24 (a motor electronic control unit), an on-board charger 25, a down converter 26, and an air-conditioning inverter 27.

The batteries 10 are mounted in the battery box 9, each of which is comprised of an Ni-MH battery, and the twenty four batteries 10 are connected in series to provide a total voltage of 288 V. The contact box 21 and the junction board 22 are connected in series between the batteries mounted in the battery box 9 and the PDU 12 through DC power lines $d_1$ and $d_2$, and the PDU 12 and the motor 5 are connected to each other through three-phase AC power lines $a_1$, $a_2$ and $a_3$.

Provided in the contact box 21 connected to the batteries 10 are a main contact 28 which is opened and closed in operative association with an ignition switch, and a pre-charger contact 29 and a pre-charger resistor 29a for preventing the main contact from being damaged due to rush current upon closing of the main contact 28. The junction board 22 has a function to distribute electric current from the DC power lines $d_1$ and $d_2$ between the contact box 21 and the PDU 12 to the on-board charger 25, the down-converter 26 and the air-conditioning inverter 27. The on-board charger 25 serves to charge the batteries 10, and includes a plug 30 for being connected to an external commercial power source. The down-converter 26 serves to charge an auxiliary battery 31 of 12 volts for driving the various auxiliaries of the electric vehicle V, and is adapted to drop the voltage of the batteries 10 to 14.5 V to supply it to the auxiliary battery 31. The air-conditioning inverter 27 is adapted to convert the DC current of the batteries 10 into the AC current to drive a compressor 32 of an air conditioner.

The managing ECU 23 governs the control of opening and closing of the main contact 28, the supplying of power to the on-board charger 25, the down-converter 26 and the air-conditioning inverter 27, the outputting of a signal indicative of a remaining capacity of the batteries 10, and the outputting of a warning signal. The motor ECU 24 controls the driving force and the regenerative braking force generated by the motor 5 by controlling the PDU 12 based on a brake signal, a selector position, an accelerator opening degree and a number of rotations per minute of the motor.

Figure 5:
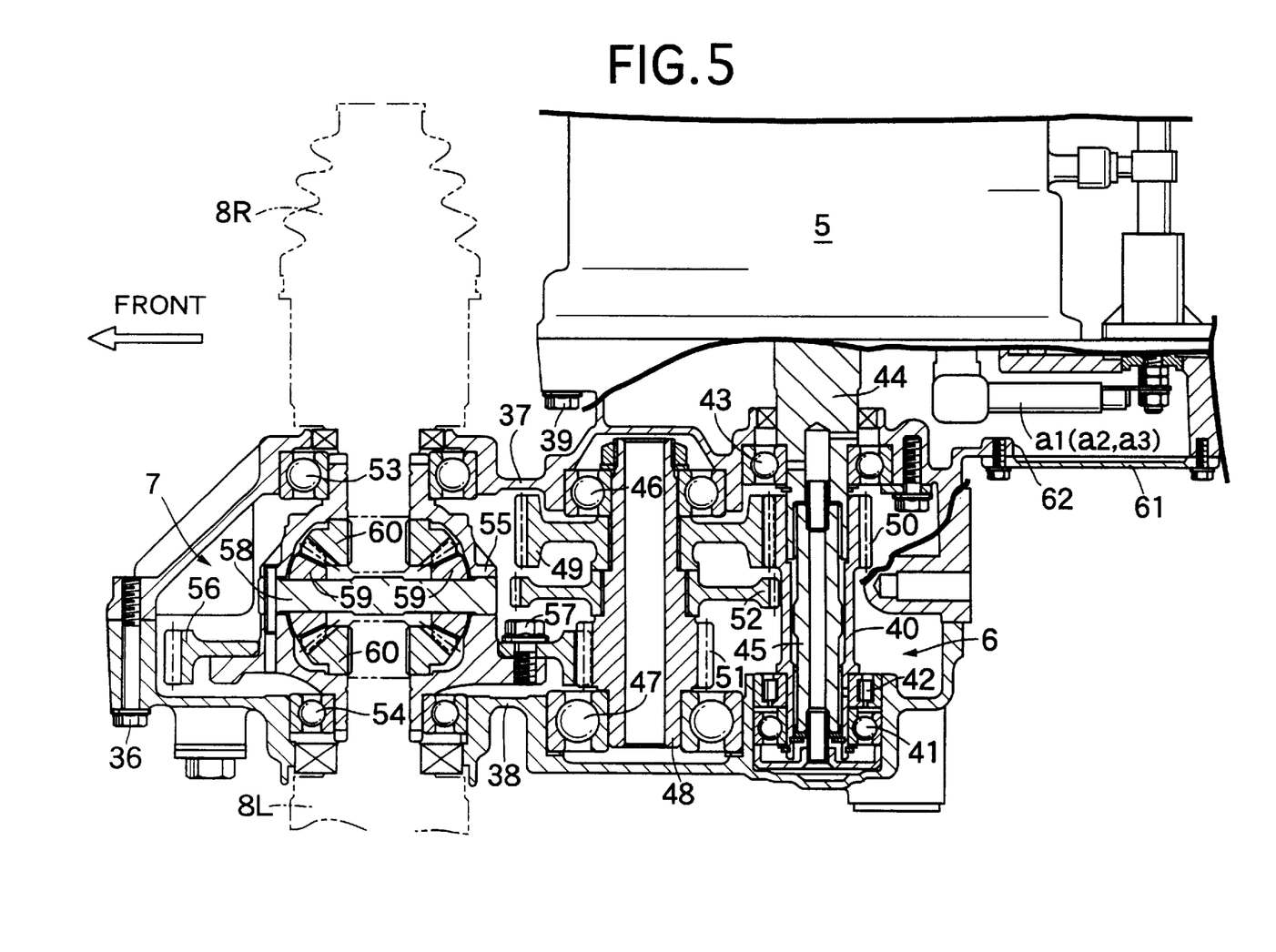
FIG. 5 is a sectional view taken in a direction of an arrow 5 or looking down in FIG. 1.

The structures of the reduction device 6 and the differential 7 will be described below with reference to FIG. 5.

The reduction device 6 and the differential 7 are accommodated within a right casing 37 and a left casing 38 which are divided laterally from each other and coupled to each other by bolts 36, and a left end face of the motor 5 is coupled to a right side of a rear portion of the right casing 37 by bolts 39. A left end of a hollow main shaft 40 is supported on the left casing 38 through a ball bearing 41 and a roller bearing 42. A motor output shaft 44 protruding from a left end face of the motor 5 is supported on the right casing 37 through a ball bearing 43 and relatively rotatably fitted to an inner periphery of a right end of the main shaft 40. A torsion shaft 45 is spline-engaged at its right end with an inner periphery of a left end of the motor output shaft 44 and spline-engaged at its left end with an inner periphery of a left end of the main shaft 40. Thus, the rotation of the motor output shaft 44 is transmitted through the torsion shaft 45 to the main shaft 40, and during this time, the variation in torque of the motor 5 is buffered by the torsional deformation of the torsion shaft 45.

A counter shaft 48 is supported on the right casing 37 and the left casing 39 through ball bearings 46 and 47, respectively, and a driven gear 49 provided on the counter shaft 48 is meshed with a driving gear 50 provided on the main shaft 40. Further, the counter shaft 48 is provided with a final driving gear 51 for transmitting a driving force to the differential 7, and a parking gear 52 capable of being locked by a parking pawl which is not shown.

A differential gear box 55 is supported on the right casing 37 and the left casing 38 through ball bearings 53 and 54, respectively, and a final driven gear 56 meshed with the final driving gear 51 is fixed to an outer periphery of the differential gear box 55 by bolts 57. A pair of differential pinions 59, 59 are rotatably carried on a pinion shaft 58 supported in the differential gear box 55 and meshed with a pair of differential side gears 60, 60, respectively, which are fixed to inner ends of the left and right driving shaft $8_L$ and $8_R$ fitted in the differential gear box 55.

An inspecting window 62 is defined in a left side of a rear portion of the right casing 37 and covered with a detachable cover 61, so that the inspection of the three-phase AC power lines $a_1$, $a_2$ and $a_3$ accommodated within the right casing 37 can be easily carried out by removing the cover 61.

Thus, the driving force of the motor 5 is transmitted from the motor output shaft 44 to the left and right front wheels $W_{FL}$ and $W_{FR}$ through the torsion shaft 45, the main shaft 40, the driving gear 50, the driven gear 49, and the counter shaft 48, the final driving gear 51, the final driven gear 56, the differential gear box 55, the pinion shaft 58, the differential pinions 59, 59, the differential side gears 60, 60, and the left and right driving shafts $8_L$ and $8_R$. The switching-over between the forward movement and the rearward movement of the electric vehicle is carried out by changing the direction of rotation of the motor 5.

As can be seen from FIGS. 1 and 5, the motor 5 and the reduction device 6 are disposed at a rear portion of the vehicle body in rear of the differential 7, and the motor 5, the reducer 6 and the differential 7 are disposed at lower locations below or lower than the level of, a floor panel 63 (shown by a thick line in FIG. 1) supported on an upper surface of the vehicle body frame assembly 4. The panel 63 extends from the vicinity of the motor 5 and the reduction device 6 toward the rear portion of the vehicle body. As a result, a longitudinal dimension of a crushable zone (see FIG. 1) defined between a front end of the vehicle body and a front end of the differential 7 can be enlarged to the maximum, thereby enhancing the shock absorbing effect of such zone upon a collision of the vehicle. Moreover, since the motor 5 and the reduction device 6 which are heavy components are disposed at locations in rear of the positions of the front wheels $W_{FL}$ and $W_{FR}$, a so-called mid-ship layout can be achieved to contribute to an enhancement in motional performance of the vehicle.

Further, since the motor 5, the reduction device 6 and the differential 7 are disposed below the level of the floor panel 63, the position of the center of gravity of the vehicle can be lowered to enhance the vehicle's stability. Moreover, even if the motor 5, the reduction device 6 and the differential 7 are moved rearwards of the vehicle body due to a shock of a collision of the vehicle, the influence there of applied to the vehicle compartment above the floor panel 63 can be suppressed to the rotational axes of minimum.

As described above, the control unit 11 and the PDU 12 are mounted by utilizing the front space in the battery box 9 closer to the motor 5 and hence, the length of the DC power lines $d_1$ and $d_2$ from the batteries 10 via the control unit 11 to the PDU 12 and the length of the three-phase AC power lines $a_1$, $a_2$ and $a_3$ from the PDU 12 to the motor 5 can be suppressed to the minimum. Also, the maintenance of the batteries 10 and the maintenance of the control unit 11 and the PDU 12 can be carried out simultaneously, leading to an enhanced convenience.

Figure 6:
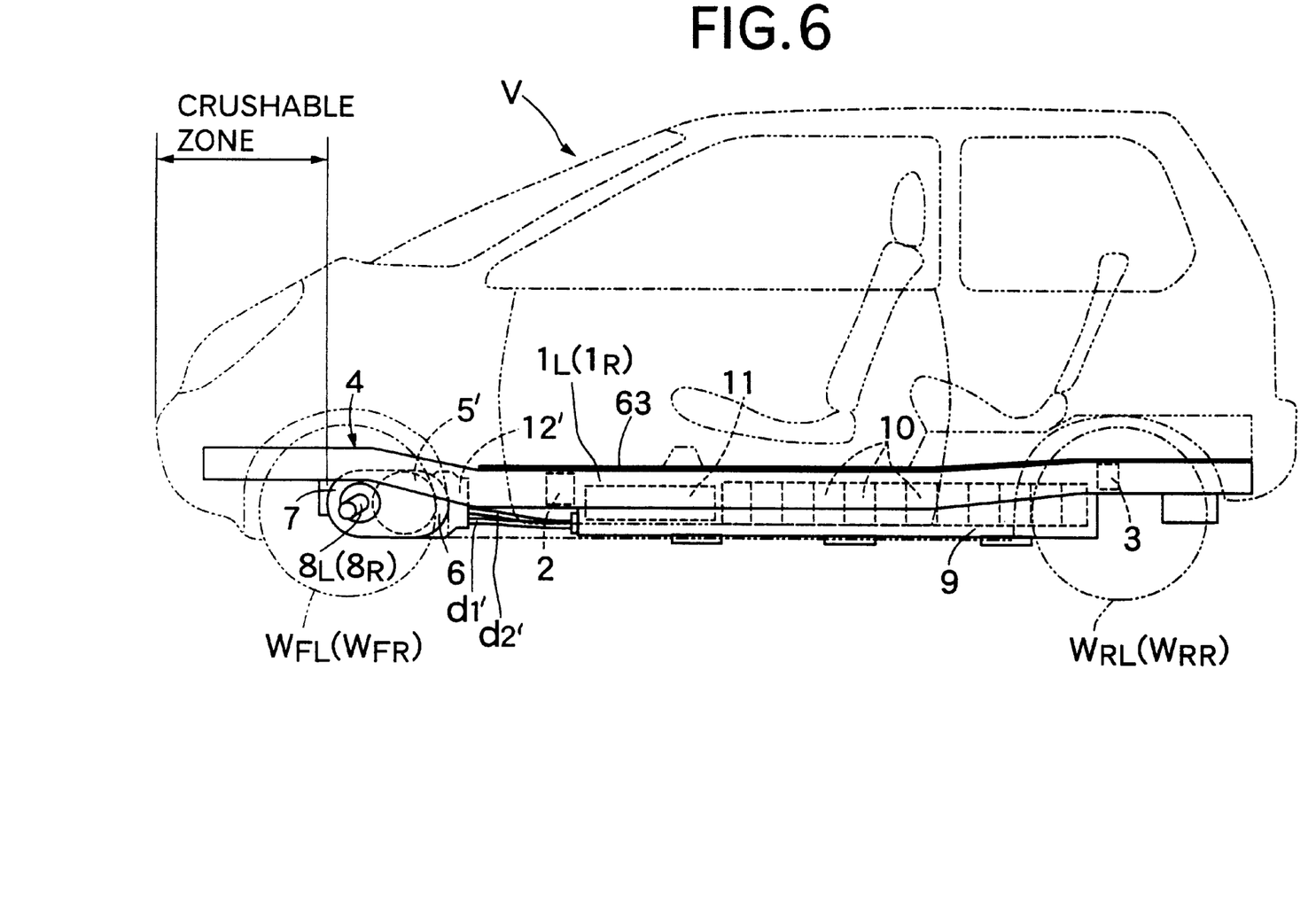
FIG. 6 is a side view of the entire electric vehicle.
Figure 7:
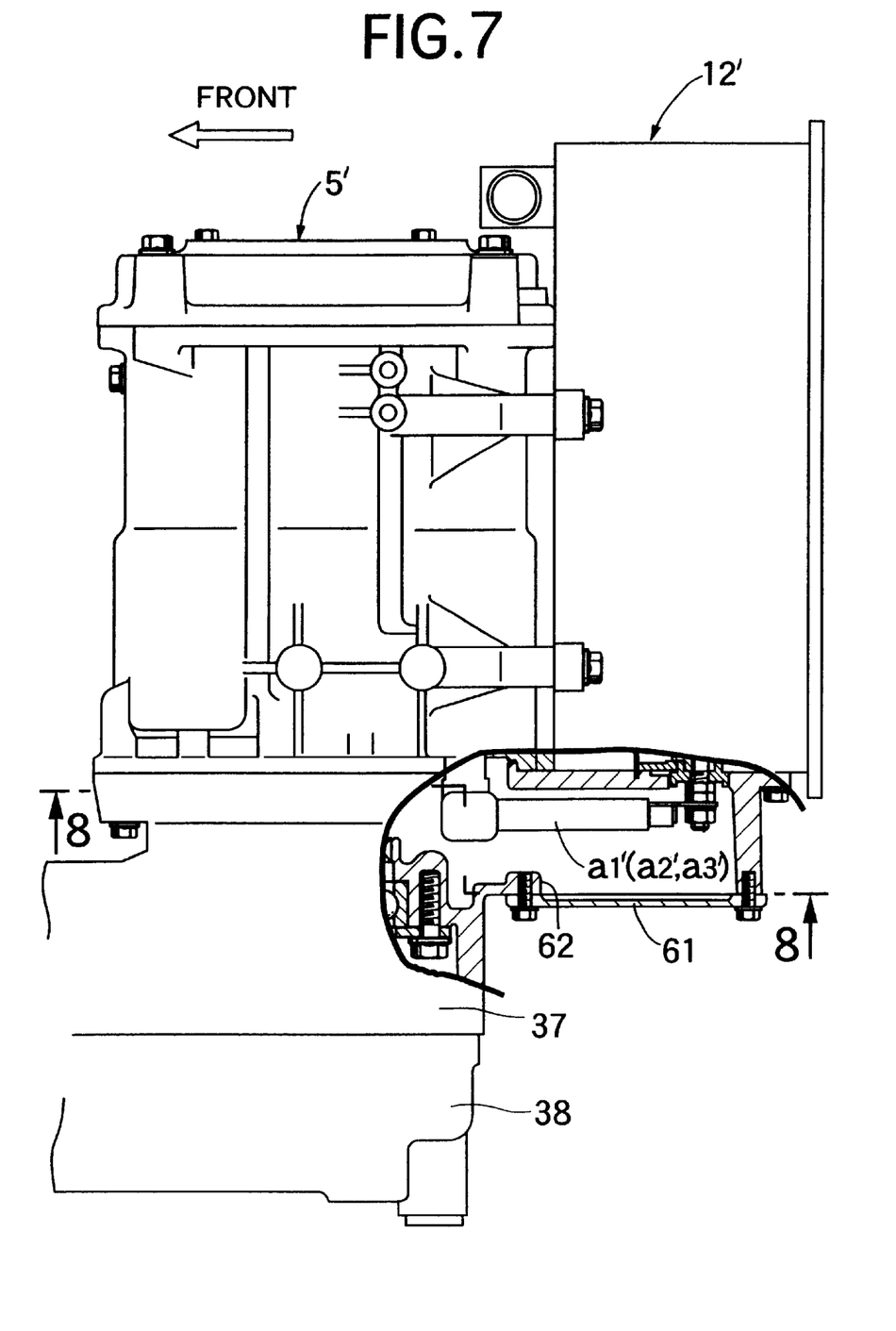
FIG. 7 is a partly sectional plan view of a motor and a PDU.
Figure 8:
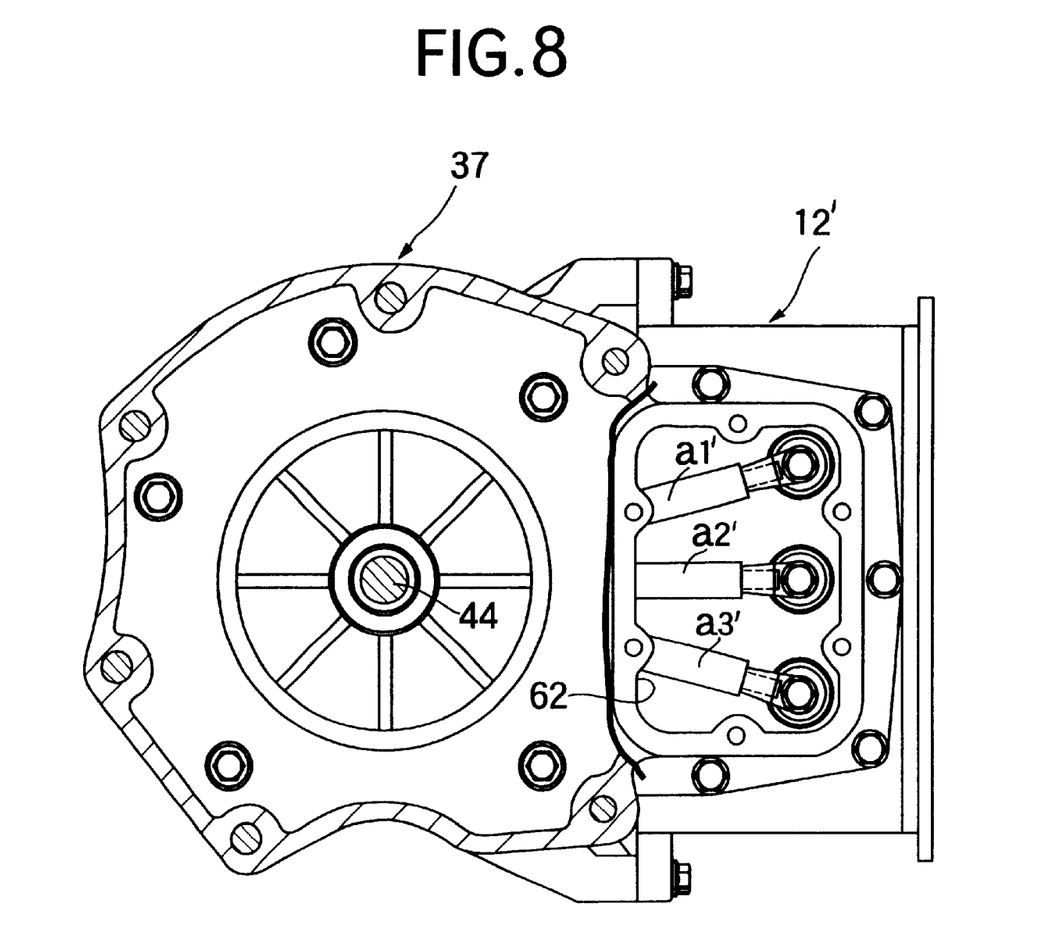
FIG. 8 is a view taken along a line 8—8 in FIG. 7.

A second embodiment of the present invention will now be described with reference to FIGS. 6 to 8.

In the above-described first embodiment, the PDU 12 has been mounted in the front portion of the battery box along with the control unit 11, but in the second embodiment, the PDU 12' is integrally mounted to a rear end of the motor 5'. Therefore, three-phase AC power lines $a_1$, $a_2$ and $a_3$ connecting the PDU 12 and the motor 5 to each other are extremely short, which can contribute to inhibition of the generation of heat due to an electric resistance and to a reduction of the weight thereof.

The three-phase AC power lines $a_1'$, $a_2'$, and $a_3'$ connecting the PDU 12 and the motor 5 to each other are accommodated within the right casing 37 and the left casing 38 of the reduction device 6 and hence, a noise generated from the three-phase AC power lines $a_1'$, $a_2$, and $a_3'$ cannot leak to an external space. As a result, any influence to an audio device and an electronic control unit of the vehicle due to the noise can be suppressed to the minimum.

Moreover, the PDU 12 is mounted at the rear end of the motor 5 and hence, the length of DC power lines $d_1'$ and $d_2'$ extending from the control unit 11 mounted in the front portion of the battery box 9 to the PDU 12 can be suppressed to the minimum.

Although the preffered of the present invention have been described in detail, it will be understood that the present invention is not limited to the above-described embodiments, and various modifications in design may be made without departing from the spirit and scope of the invention defined in claims.

What is claimed is:

1. An electric vehicle constructed to travel by transmitting a driving force of a motor mounted at a front portion of a vehicle body through a reduction device and a differential to front wheels, wherein said motor and said reduction device are disposed at portions of the vehicle body rearwardly of said differential, said motor, said reduction device and said differential are disposed below a floor panel, and said motor, said reduction device and said differential are formed integrally with each other; and wherein the electric vehicle further includes batteries on the vehicle body and a current inverter disposed rearwardly of said motor and forwardly of said batteries, said current inverter provided integrally with said motor for operatively connecting the batteries to the motor and converting DC current of said batteries into AC current, and a power line for flowing the AC current to said motor, said power line being accommodated within a casing of said reduction device.

2. An electric vehicle according to claim 1, wherein said batteries are mounted at a central portion of the vehicle body.

3. An electric vehicle according to claim 1, wherein said motor and said reduction device are disposed rearwardly of rotational axes of said front wheels.

4. An electric vehicle according to claim 1, wherein said motor, said reduction device and said differential are disposed forwardly of said floor panel at a level lower than that of the floor panel.

5. An electric vehicle according to claim 1, wherein said body has a crushable zone formed at front portion thereof forwardly of axles of said front wheels, and said motor is located rearwardly of said axles.

6. An electric vehicle according to claim 5, wherein said body has a pair of laterally spaced side frames, and said motor, said differential and said reducing device are disposed at a level below upper surfaces of said side frames.

7. An electric vehicle according to claim 1, further including a control unit disposed forwardly of said batteries, said power line connecting said current inverter to said batteries via said control unit.

8. An electric vehicle comprising:

front driven wheels;

a motor mounted at a front portion of a body of the vehicle;

a reduction device and a differential operatively connecting said motor to said front wheels for driving the wheels;

said motor and said reduction device being disposed rearwardly of the differential;

batteries for supplying power to said motor; and a current inverter disposed rearwardly of said motor and operatively connecting the batteries to said motor; wherein said motor, said reduction device arid said differential are formed integrally with each other, wherein said current inverter is mounted to a car end of said motor so as to be provided integrally with said motor, and wherein the electric vehicle further includes a power line for connecting the current inverter to said motor, the power line being accommodated within a casing of said reduction device.

9. An electric vehicle according to claim 8, wherein said motor, said reduction device and said differential are disposed at a level lower than a floor panel of said vehicle body.

10. An electric vehicle according to claim 8, wherein said current inverter is a power drive unit.

11. An electric vehicle according to claim 8, further including a control unit disposed forwardly of said batteries, said power line connecting said current inverter to said batteries via said control unit.

12. An electric vehicle constructed to travel by transmitting a driving force of a motor mounted at a front portion of a vehicle body through a reduction device and a differential to front wheels;

said vehicle comprising:

a floor panel;

a left side frame and a right side frame extending longitudinally beneath the vehicle body; and affront cross member connecting said left and right side frames; and a battery box in which a control unit and a current inverter are accommodated;

wherein said motor and said reduction device are disposed rearwardly of said differential;

wherein said motor said reduction device and said differential are disposed below said floor panel, between said left and right side frames, and in front of said cross member; and further wherein said battery box is disposed rearwadly of said cross member.

13. The electric vehicle of claim 12, wherein said differential is connected to each of said front wheels via respective drive shafts, and further wherein a portion of said differential overlaps said drive shafts when viewed in a lateral direction of said vehicle body.

14. An electric vehicle, comprising:

a pair of front driven wheels;

a vehicle body;

a left side frame and a right side frame extending longitudinally beneath the vehicle body; and a front cross member connecting said left and right side frames;

a motor mounted at a front portion of said vehicle body;

a reduction device and a differential operatively connecting said motor to said front wheels for driving the wheels;

a battery box disposed rearwardly of said cross member;

batteries in said battery box for supplying power to said motor;

a control unit in said battery box at a position forwardly of said batteries; and a current inverter disposed rearwardly of and provided integrally with said motor; and operatively connecting the batteries to said motor;

wherein said motor and said reduction device are disposed rearwardly of the differential; and further wherein said motor, said differential, and said reduction device are situated between said left and right side frames, and in font of said cross member.

15. The electric vehicle of claim 14, wherein said differential is connected to each of said front wheels via respective drive shafts and further wherein a portion of said differential overlaps said drive shafts when viewed in a lateral direction of said vehicle body.

* * * * *

UNITED STATES PATENT AND TRADEMARK OFFICE
CERTIFICATE OF CORRECTION

PATENT NO. : 6,598,691 B2
DATED : July 29, 2003
INVENTOR(S) : Yoshinori Mita, Kazunari Takahashi and Shiro Yamamuro It is certified that error appears in the above-identified patent and that said Letters Patent is hereby corrected as shown below:

Title page,
Item [56], References Cited, U.S. PATENT DOCUMENTS, change
"5,641,031 A * 6/1997 Reimer et al. .........180/65.3" to
-- 5,641,031 A * 6/1997 Riemer et al. .........180/65.3 --.
Item [57], ABSTRACT,
Line 10, change "the vehicle body, leading to a mid-ship layout. This conrti-" to
-- the vehicle body, leading to a mid-ship layout. This contri- --.

Column 1,
Line 28, change "viewpoint of enhancing a in motional property of the" to
-- viewpoint of enhancing a motional property of the --.
Line 36, change "enhanced in comparison to the conventional vehicle" to
-- enhanced in comparison to the conventional vehicle --.
Line 54, change "leading to an enhanced stability with such disposition, even" to
-- leading to an enhanced stability. With such disposition, even --.

Column 2,
Line 26, change "liable to generate noises is accommodated within the casing" to
-- liable to generate noise, is acommodated within the casing --.
Line 29, change "and prevented from leaking to the outside. This is desireable" to
-- and prevented from leaking to the outside. This is desirable --.
Line 48, change "5 or looking down in FIG. 1;" to -- 5, or looking down, in FIG. 1; --.

Column 3,
Line 20, change "driving and regenerative operation of the motor 5 by a" to
-- driving and regenerative operations of the motor 5 by a --.
Line 36, change "control unit), and on-board charger 25, a down converter 26," to
-- control unit), an on-board charger 25, a down-converter 26, --.

Column 4,
Line 26, change "the main shaft 40, and during this time, the variation in" to
-- the main shaft 40, and during this time, any variation in --.

Column 5,
Line 2, change "locations below or lower than the level of, a floor panel 63" to
-- locations below, or lower than the level of, a floor panal 63 --.
Line 14, change "of the front wheels $W_{FL}$ and $W_{FR}$, a so-called mid-ship" to
-- of the rotational axes of front wheels $W_{FL}$ and $W_{FR}$, a so-called mid-ship --.
Line 23, change "collision of the vehicle, the influence there of applied to the" to
-- collision of the vehicle, the influence thereof applied to the --.

UNITED STATES PATENT AND TRADEMARK OFFICE
CERTIFICATE OF CORRECTION

PATENT NO. : 6,598,691 B2
DATED : July 29, 2003
INVENTOR(S) : Yoshinori Mita, Kazunari Takahashi and Shiro Yamamuro It is certified that error appears in the above-identified patent and that said Letters Patent is hereby corrected as shown below:

Column 5 (cont'd),
Line 25, change "pressed to the rotational axes of minimum." to
-- pressed to the minimum. --.
Line 48, change "The three-phase AC power lines $a_1'$, $a_2$, and $a_3'$ connecting" to
-- The three-phase AC power lines $a_1'$, $a_2'$ and $a_3'$ connecting --.
Line 49, change "the PDU 12 and the motor 5 to each other are accommodated" to
-- the PDU 12' and the motor 5' to each other are accommodated- --.
Line 52, change "three-phase AC power lines $a_1'$, $a_2$, and $a_3'$ cannot leak to an" to
-- three-phase AC power lines $a_1'$, $a_2'$ and $a_3'$ cannot leak to an --.
Line 56, change "Moreover, the PDU 12 is mounted at the rear end of the" to
-- Moreover, the PDU 12' is mounted at the rear end of the --.
Line 57, change "motor 5 and hence, the length of DC power lines $d_1'$ and $d_2'''$" to
-- motor 5' and hence, the length of DC power lines $d_1'$ and $d_2'$ --.
Line 59, change "portions of the battery box 9 to the PDU 12 can be suppressed" to
-- portion of the battery box 9 to the PDU 12' can be suppressed --.
Line 62, change "Although the preffered of the present invention have been" to
-- Although the preferred embodiments of the present invention have been --.

Column 6,
Line 30, change "body has a crushable zone formed at front portion thereof" to
-- body has a crushable zone formed at a front portions thereof --.
Line 56, change "said motor, said reduction device arid said differential are" to
-- said motor, said reduction device and said differential are --.
Line 58, change "wherein said current inverter is mounted to a car end of" to
-- wherein said current inverter is mounted to a rear end of --.

Column 7,
Line 14, change "tudinally beneath the vehicle body; and affront cross" to
-- tudinally beneath the vehicle body; and a front cross --.
Line 21, change "wherein said motor said reduction device and said differ-" to
-- wherein said motor, said reduction device and said differ- --.
Line 25, change "further wherein said battery box is disposed rearwardly of" to
-- further wherein said battery box is disposed rearwardly of --.

Column 8,
Line 18, change "integrally with said motor; and operatively connecting" to
-- integrally with said motor and operatively connecting --.

UNITED STATES PATENT AND TRADEMARK OFFICE
CERTIFICATE OF CORRECTION

PATENT NO. : 6,598,691 B2
DATED : July 29, 2003
INVENTOR(S) : Yoshinori Mita, Kazunari Takahashi and Shiro Yamamuro It is certified that error appears in the above-identified patent and that said Letters Patent is hereby corrected as shown below:

<u>Column 8 (cont'd),</u>
Line 21, change "rearwardly of the differential; and further wherein said" to
-- rearwardly of the differential;
and further wherein said --.
Line 24, change "font of said cross member." to
-- front of said cross member. --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,598,691 B2
APPLICATION NO. : 09/216029
DATED : July 29, 2003
INVENTOR(S) : Yoshinori Mita, Kazunari Takahashi and Shiro Yamamuro It is certified that error appears in the above-identified patent and that said Letters Patent is hereby corrected as shown below:

Title page,
Item [56], References Cited, U.S. PATENT DOCUMENTS, change
"5,641,031 A * 6/1997 Reimer et al. .........180/65.3" to
-- 5,641,031 A * 6/1997 Riemer et al. .........180/65.3 --.
Item [57], ABSTRACT,
Line 10, change "the vehicle body, leading to a mid-ship layout. This conrti-" to
-- the vehicle body, leading to a mid-ship layout. This contri- --.

Column 1,
Line 28, change "viewpoint of enhancing a in motional property of the" to
-- viewpoint of enhancing a motional property of the --.
Line 36, change "enhanced in comparison to the conventional vechicle" to
-- enhanced in comparison to the conventional vehicle --.
Line 54, change "leading to an enhanced stability with such disposition, even" to
-- leading to an enhanced stability. With such disposition, even --.

Column 2,
Line 26, change "liable to generate noises is accommodated within the casing" to
-- liable to generate noise, is accommodated within the casing --.
Line 29, change "and prevented from leaking to the outside. This is desireable" to
-- and prevented from leaking to the outside. This is desirable --.
Line 48, change "5 or looking down in FIG. 1;" to -- 5, or looking down, in FIG. 1; --.

Column 3,
Line 20, change "driving and regenerative operation of the motor 5 by a" to
-- driving and regenerative operations of the motor 5 by a --.
Line 36, change "control unit), an on-board charger 25, a down converter 26," to
-- control unit), an on-board charger 25, a down-converter 26, --.

Column 4,
Line 26, change "the main shaft 40, and during this time, the variation in" to
-- the main shaft 40, and during this time, any variation in --.

Column 5,
Line 2, change "locations below or lower than the level of, a floor panel 63" to
-- locations below, or lower than the level of, a floor panel 63 --.
Line 14, change "of the front wheels $W_{FL}$ and $W_{FR}$, a so-called mid-ship" to
-- of the rotational axes of front wheels $W_{FL}$ and $W_{FR}$, a so-called mid-ship --.
Line 23, change "collision of the vehicle, the influence there of applied to the" to
-- collision of the vehicle, the influence thereof applied to the --.

UNITED STATES PATENT AND TRADEMARK OFFICE
CERTIFICATE OF CORRECTION

PATENT NO. : 6,598,691 B2
APPLICATION NO. : 09/216029
DATED : July 29, 2003
INVENTOR(S) : Yoshinori Mita, Kazunari Takahashi and Shiro Yamamuro It is certified that error appears in the above-identified patent and that said Letters Patent is hereby corrected as shown below:

Column 5 (cont'd),
Line 25, change "pressed to the rotational axes of minimum." to
-- pressed to the minimum. --.
Line 48, change "The three-phase AC power lines $a_1'$, $a_2$, and $a_3'$ connecting" to
-- The three-phase AC power lines $a_1'$, $a_2'$ and $a_3'$ connecting --.
Line 49, change "the PDU 12 and the motor 5 to each other are accommodated" to
-- the PDU 12' and the motor 5' to each other are accommodated- --.
Line 52, change "three-phase AC power lines $a_1'$, $a_2$, and $a_3'$ cannot leak to an" to
-- three-phase AC power lines $a_1'$, $a_2'$ and $a_3'$ cannot leak to an --.
Line 56, change "Moreover, the PDU 12 is mounted at the rear end of the" to
-- Moreover, the PDU 12' is mounted at the rear end of the --.
Line 57, change "motor 5 and hence, the length of DC power lines $d_1'$ and $d_2'''$" to
-- motor 5' and hence, the length of DC power lines $d_1'$ and $d_2'$ --.
Line 59, change "portion of the battery box 9 to the PDU 12 can be suppressed" to
-- portion of the battery box 9 to the PDU 12' can be suppressed --.
Line 62, change "Although the preffered of the present invention have been" to
-- Although the preferred embodiments of the present invention have been --.

Column 6,
Line 30, change "body has a crushable zone formed at front portion thereof" to
-- body has a crushable zone formed at a front portion thereof --.
Line 56, change "said motor, said reduction device arid said differential are" to
-- said motor, said reduction device and said differential are --.
Line 58, change "wherein said current inverter is mounted to a car end of" to
-- wherein said current inverter is mounted to a rear end of --.

Column 7,
Line 14, change "tudinally beneath the vehicle body; and affront cross" to
-- tudinally beneath the vehicle body; and a front cross --.
Line 21, change "wherein said motor said reduction device and said differ-" to
-- wherein said motor, said reduction device and said differ- --.
Line 25, change "further wherein said battery box is disposed rearwardly of" to
-- further wherein said battery box is disposed rearwardly of --.

Column 8,
Line 18, change "integrally with said motor; and operatively connecting" to
-- integrally with said motor and operatively connecting --.

UNITED STATES PATENT AND TRADEMARK OFFICE
CERTIFICATE OF CORRECTION

PATENT NO. : 6,598,691 B2  
APPLICATION NO. : 09/216029  
DATED : July 29, 2003  
INVENTOR(S) : Yoshinori Mita, Kazunari Takahashi and Shiro Yamamuro

It is certified that error appears in the above-identified patent and that said Letters Patent is hereby corrected as shown below:

Column 8 (cont'd),  
Line 21, change "rearwardly of the differential; and further wherein said" to  
-- rearwardly of the differential;  
and further wherein said --.  
Line 24, change "font of said cross member." to  
-- front of said cross member. --.

This certificate supersedes Certificate of Correction issued April 13, 2004.

Signed and Sealed this

Tenth Day of October, 2006

JON W. DUDAS  
*Director of the United States Patent and Trademark Office*